United States Patent [19]
Nishida et al.

[11] Patent Number: 6,020,831
[45] Date of Patent: Feb. 1, 2000

[54] FLIGHT CONTROL SYSTEM USER INTERFACE APPARATUS AND CONTROL DATA DISPLAY METHOD THEREOF

[75] Inventors: Masao Nishida; Yasuhiro Taka; Toshikazu Nakajima; Ryuji Otsuka, all of Tokyo, Japan

[73] Assignee: Oki Electric Industry Co., Ltd., Tokyo, Japan

[21] Appl. No.: 09/084,792

[22] Filed: May 27, 1998

[30] Foreign Application Priority Data

Jun. 6, 1997 [JP] Japan .................................. 9-149453

[51] Int. Cl.$^7$ .................................................. G08B 21/00
[52] U.S. Cl. ........................ 340/945; 340/961; 340/972; 340/990; 340/995
[58] Field of Search .................................... 340/945, 961, 340/990, 972, 995, 988, 525; 701/120, 219, 208, 213; 342/456, 36; 345/173, 146; 341/22

[56] References Cited

U.S. PATENT DOCUMENTS

| | | | |
|---|---|---|---|
| 5,243,530 | 9/1993 | Stanifer et al. | 701/219 |
| 5,313,201 | 5/1994 | Ryan | 340/961 |
| 5,574,648 | 11/1996 | Pilley | 701/120 |
| 5,629,691 | 5/1997 | Jain | 340/961 |

*Primary Examiner*—Benjamin C. Lee
*Attorney, Agent, or Firm*—Venable; Robert J. Frank

[57] ABSTRACT

A flight control system user interface apparatus and a control data display method thereof are provided to reduce a workload on a controller and to increase the safety of flight. A main-control terminal on a man-machine interface apparatus for use in a flight control system has an aircraft position display area 102, an aircraft order display area 102, a simple strip display area 104, an aircraft data display area 104, and a control pilot data link communication display area. These areas are arranged in such a way that they are controlled by one input unit.

17 Claims, 12 Drawing Sheets

FLIGHT CONTROL SYSTEM USER INTERFACE APPARATUS AND CONTROL DATA DISPLAY METHOD THEREOF

BACKGROUND OF THE INVENTION

1. Field of the Invention

The present invention relates to a flight control system, and more particularly to a man-machine interface apparatus for air terminal control and a control data display method using the apparatus.

2. Description of the Prior Art

Conventionally, a CRT display used for a flight control system, provides only an aircraft position display area and a flight strip display area, other information being not being applied to the display. Here, the aircraft position display area shows the current position of an aircraft during flight while the flight strip display shows the flight plans or schedules of the aircraft from departure to arrival. The conventional aircraft position display area is related to the flight strip display area only in one direction from the former to the latter. For example, if an aircraft is specified arbitrarily in the aircraft position display area, the arrival order of the aircraft becomes clear in the flight strip display area.

However, the above apparatus has not provided efficiently an operator, or a controller, with the information necessary to control flights of aircraft from departure to arrival. In addition, the configuration thereof is not easily operated by the controller.

It is an object of the present invention to provide a user interface apparatus for a flight control system and a control data display method thereof which enables efficient and easy control operation of aircraft.

SUMMARY OF THE INVENTION

It is therefore an object of the present invention to provide a flight control system user interface apparatus for displaying statuses of aircraft comprising: a screen which shows the statuses of the aircraft, the statuses including two or more of the position, departure order, arrival order, flight plan, message, and message history for each aircraft, the screen being divided into two or more areas, one of the areas indicating one of the statuses and another indicating another thereof; a pointing device used for specifying an aircraft to be controlled in one of the areas; a status information collecting unit which collects status information on the statuses of the aircraft, status information being correlated with each other; and a processing unit which provides the screen with the status information on the status of the aircraft specified in the one area and status information in another area corresponding thereto, to allow the former area to indicate the former status and the latter area to indicate the latter status.

It is another object of the present invention to provide a control display method used for a flight control system comprising the steps: allocating statuses of aircraft including two or more of the position, departure order, arrival order, flight plan, message, and message history of the aircraft, to two or more areas of a screen of the flight control system; collecting status information on the statuses of the aircraft; correlating status information on the aircraft in one area with status information thereon in another area; specifying an aircraft on one of the areas; providing status information on the status of the aircraft specified in the one area and corresponding status information on another area; and permitting the screen to respectively indicate statuses of the aircraft in the former area and the latter area based upon the provided status information.

BRIEF DESCRIPTION OF THE DRAWINGS

The present invention will be understood more fully from the detailed description and the accompanying drawings of the preferred embodiments of the invention.

In the drawings.

DESCRIPTION OF THE PREFERRED EMBODIMENTS

Figure 1:
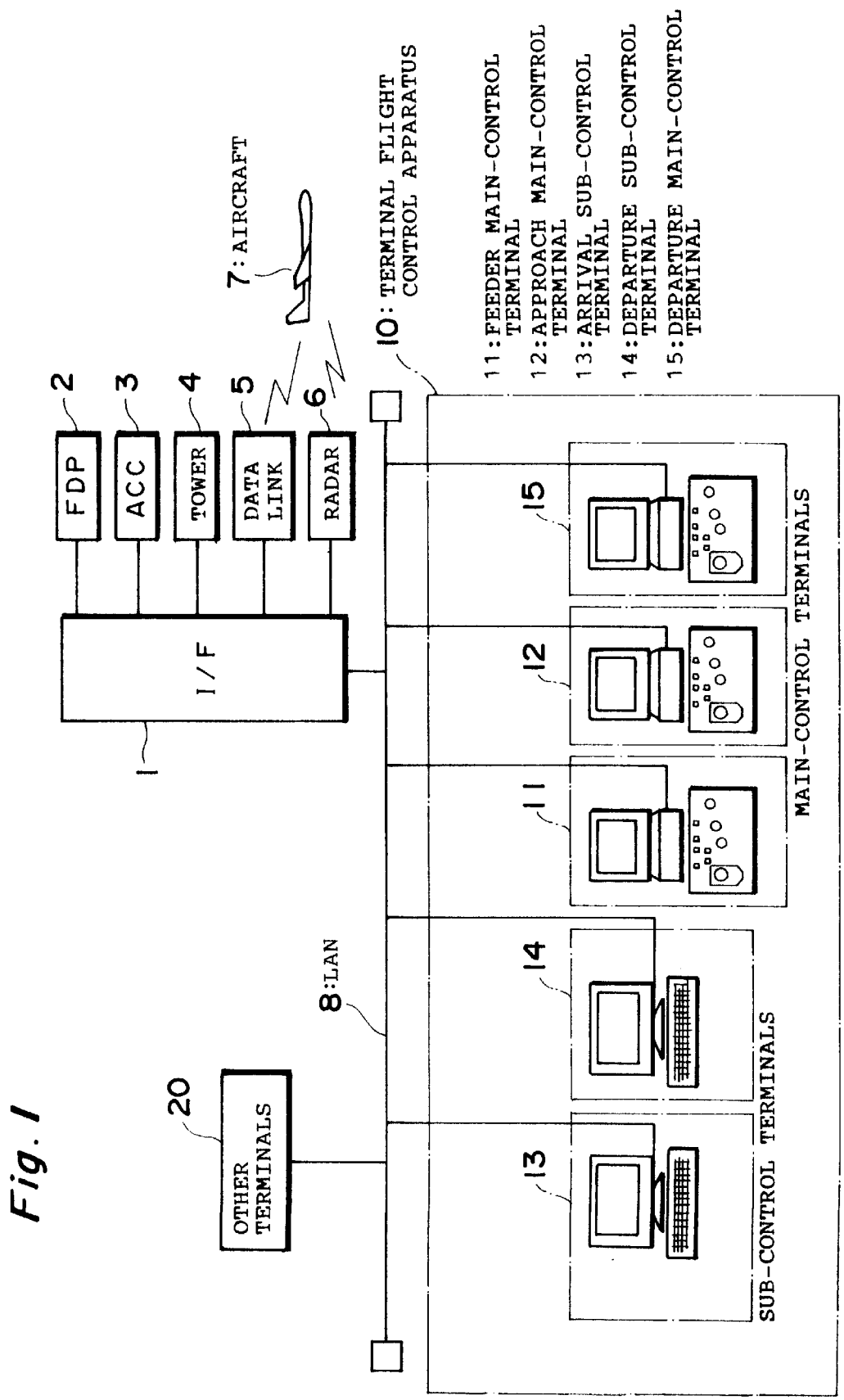
FIG. 1 is an overall configuration diagram showing an embodiment of a flight control system according to the present invention.

An embodiment of the present invention will be described in detail with reference to the accompanying drawings. FIG. 1 is an overall configuration diagram of a flight control system of an embodiment according to the present invention. As shown in this figure, a terminal flight control apparatus 10 and terminals 20, connected to a LAN (Local Area Network) 8, communicate digitally via the interface 1 with controllers on an FDP (Flight Data Processing System) 2, an ACC (Area Control Center) 3, and a tower (control tower control) 4 and with an aircraft 7. It also has a data link 5 and a radar 6 via which the position data, heading data, altitude data, and speed data on the aircraft 7 are obtained.

The data link 5 may use one of the following communication methods:
(1) Satellite communication
(2) VHF communication (VDL: VHF digital link)
(3) Secondary radar (SSR) communication The radar 6 obtains positional data on the aircraft 7. The FDP 2 controls flight cards. The ACC 3 and the tower 4 have a control apparatus used by airport terminal controllers to exchange data. On the terminal flight control apparatus 10, number 11 denotes a FEEDER main-control terminal 11, number 12 denotes an APPROACH main-control terminal 12, number 13 denotes an arrival flight sub-control terminal 13, number 14 denotes a departure flight sub-control terminal, and number 15 denotes a departure main-control terminal.

The terminals 11–15 are classified roughly into the following two group.

Main-control terminals include, for example the FEEDER main-control terminal 11, APPROACH main-control terminal 12, and departure main-control terminal 15. These terminals are used by controllers who monitor area data (aircraft traffic data, wind direction, etc.) and send operation instructions (change in flight heading, altitude, speed, etc.) to pilots as necessary so that aircraft fly safely and speedily.

Sub-control terminals includes, for example the arrival flight sub-control terminal 13 and the departure flight sub-control terminal 14. These terminals are used by sub-controllers who coordinate with other main-control facilities, report the results to the main-control terminals, and help controllers at main-control terminals perform sub-control operation.

The following outlines two types of terminals: main-control terminals and sub-control terminals.

Figure 2:
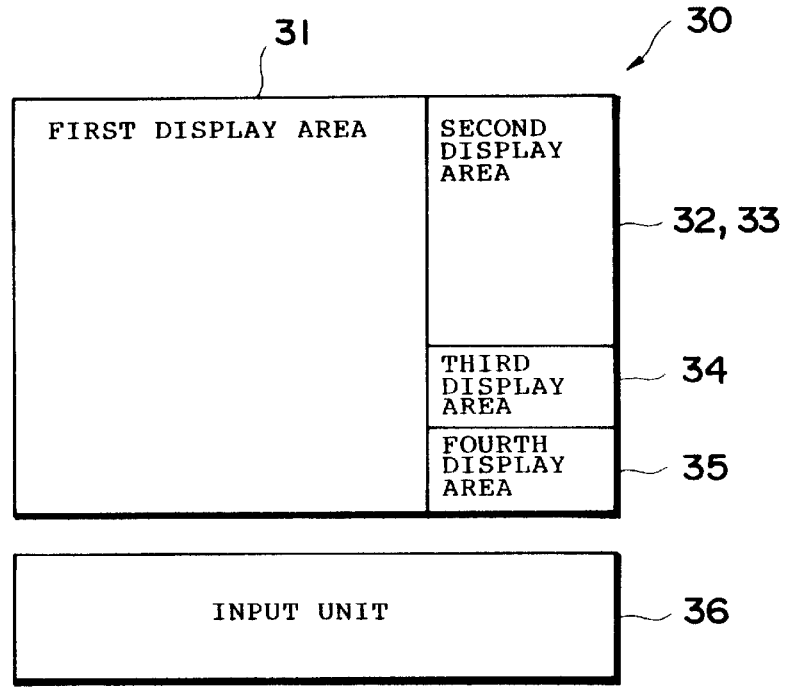
FIG. 2 is a configuration diagram showing a maincontrol terminal of the embodiment according to the present invention.

The configuration of the main-control terminal is described first. FIG. 2 is a configuration diagram showing a the main-control terminal of the embodiment according to the present invention. As shown in this figure, the main-control terminal has a CRT 30 which is divided into four areas: first display area 31, second display area 32 or 33, third display area 34, and fourth display area 35. It also has an input unit 36.

Figure 3:
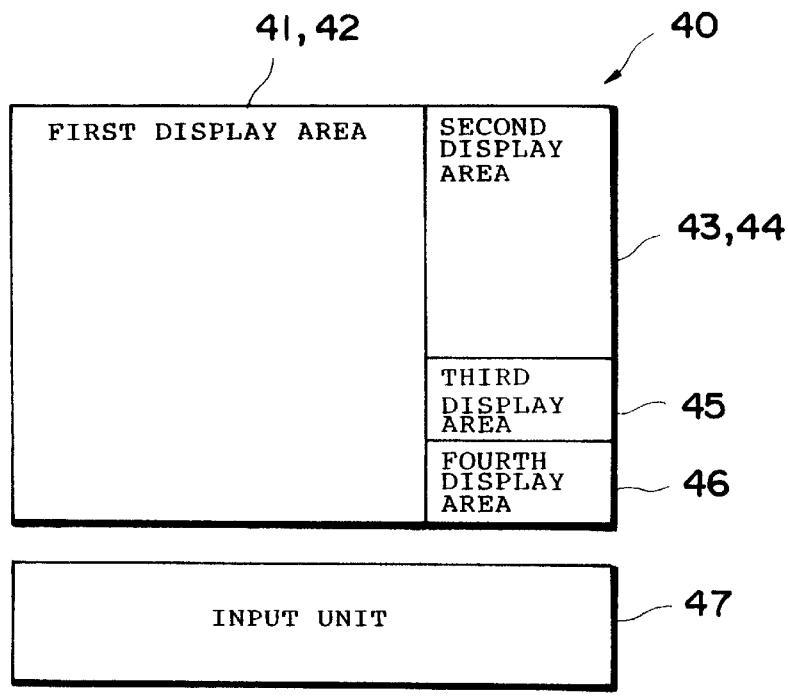
FIG. 3 is a configuration diagram showing a sub-control terminal of the embodiment according to the present invention.

FIG. 3 is a configuration diagram showing a sub-control terminal of the embodiment according to the present invention. As shown in this figure, the sub-control terminal has a CRT 40 which is divided into four areas: first display area 41 or 42, second display area 43 or 44, third display area 45, and fourth display area 46. It also has an input unit 47 used to control these areas.

Figure 4:
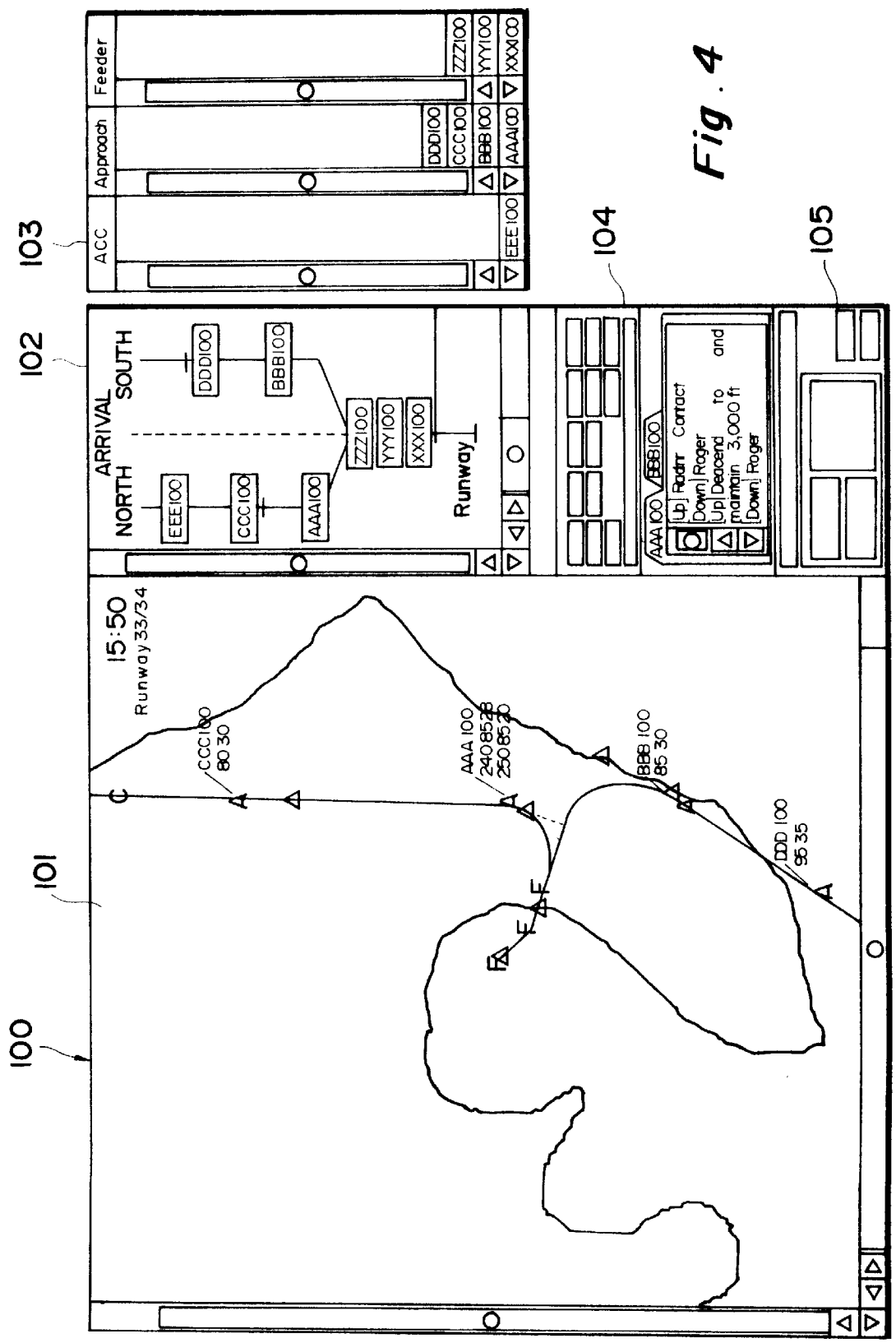
FIG. 4 is a detailed diagram showing the main-control terminal of the embodiment according to the present invention.

An example of a main-control terminal is described with reference to FIGS. 4 to 6. FIG. 4 is an example of the display screen of the main-control terminal of the embodiment according to the present invention, FIGS. 5(*a*)–5(*f*) are illustrations of the display areas, and FIG. 6 is a block diagram of the display screen processing system of the main-control terminal.

As shown in FIG. 4, the CRT 100 has an aircraft position display area 101, an aircraft order display area 102, a simple strip display area 103, an aircraft data display area 104, and control pilot data link communication (CPDLC) display area 105. These areas are controlled by an input unit 106 shown in FIG. 5 (*f*). The aircraft order display area 102 and the simple strip display area 103 may be selectively displayed.

Each display area of the main-control terminal is described with reference to FIGS. 5(*a*)–5(*f*). In the aircraft position display area 101, flying aircraft are displayed on the basis of data received by the radar, as shown in FIG. 4 and FIG. 5 (*a*). The current heading, altitude, speed, and other data on each aircraft is also displayed.

The aircraft order display area 102 is used as one of two display areas. In the aircraft order display area 102, aircraft are displayed on the time axis in arrival time order, as shown in FIG. 4 and FIG. 5(*b*), according to the time at which each aircraft is expected to pass a specified point. Aircraft are also displayed on the time axis in departure time order according to the time at which each aircraft will pass a specified point. In the simple strip display area 103, simple flight plan data on aircraft which are flying or will fly, is displayed, as shown in FIG. 4 and FIG. 5(*c*).

In the aircraft data display area 104, a flight plan and communication history data on a selected aircraft is displayed, as shown in FIG. 4 and FIG. 5(*d*). Examples of history data on aircraft A are "UP: TURN RIGHT 230 DEGREES" (from controller to pilot) and "DOWN: ROGER" (from pilot to controller)." In the control pilot data link communication display area 105, created flight control instruction messages to be sent to pilots are displayed, as shown in FIG. 4 and FIG. 5(*e*). The input unit 106 is used to control the above five display areas, as shown in FIG. 5(*f*).

Hereinafter, the configuration of the screen processing system will be described. As shown in FIG. 6, the display screen processing system of this main-control terminal incorporates a pointing device 51, selection target determination module 52, selection target storage module 53, display processing module 54, aircraft position display area 55, aircraft order display area 56, simple strip display area 57, aircraft data display area 58, control pilot data link communication display area 59, and input unit 60 used to control the modules.

A representative of the pointing device 51 is a mouse or a track ball (including a selection button and a cancel button) used to move the cursor, or to select or cancel an object displayed on the CRT. The selection target determination module 52 determines which object on the CRT is selected. The selection target storage module 53 contains information on an object determined by the selection target determination module 52 as selected. The display processing module 54 displays one or more objects having the same call sign as that of an object which is selected and whose information is stored in the selection target storage module 53. In the aircraft position display area 55, aircraft flight information (current position, heading, altitude, and speed, etc.) and flight area information (flight area boundary, standard arrival route, radio flight facilities, FIX, etc.) are displayed. In the aircraft order display area 56, information on arriving and departing aircraft is displayed in the order in which they are estimated to pass a specific point. In the simple strip display area 57, the strips of all aircraft controlled by the sub-control terminal are displayed (only the call sign of each strip is displayed). In the aircraft data display area 58, a strip and a history of messages transferred between the main-control terminal and pilots are displayed. In the control pilot data link communication display area 59, messages to be sent to pilots are prepared. The input unit 60 is used to prepare messages to be sent to pilots. In the screen processing system, the display processing module 52 waits for the call sign of an object or a target in the selected state, from the selection target determination module. Upon receipt of a call sign, the display processing module 52 indicates all of the objects having the same call sign as the above call sign, the objects being in a selected state.

Figure 7:
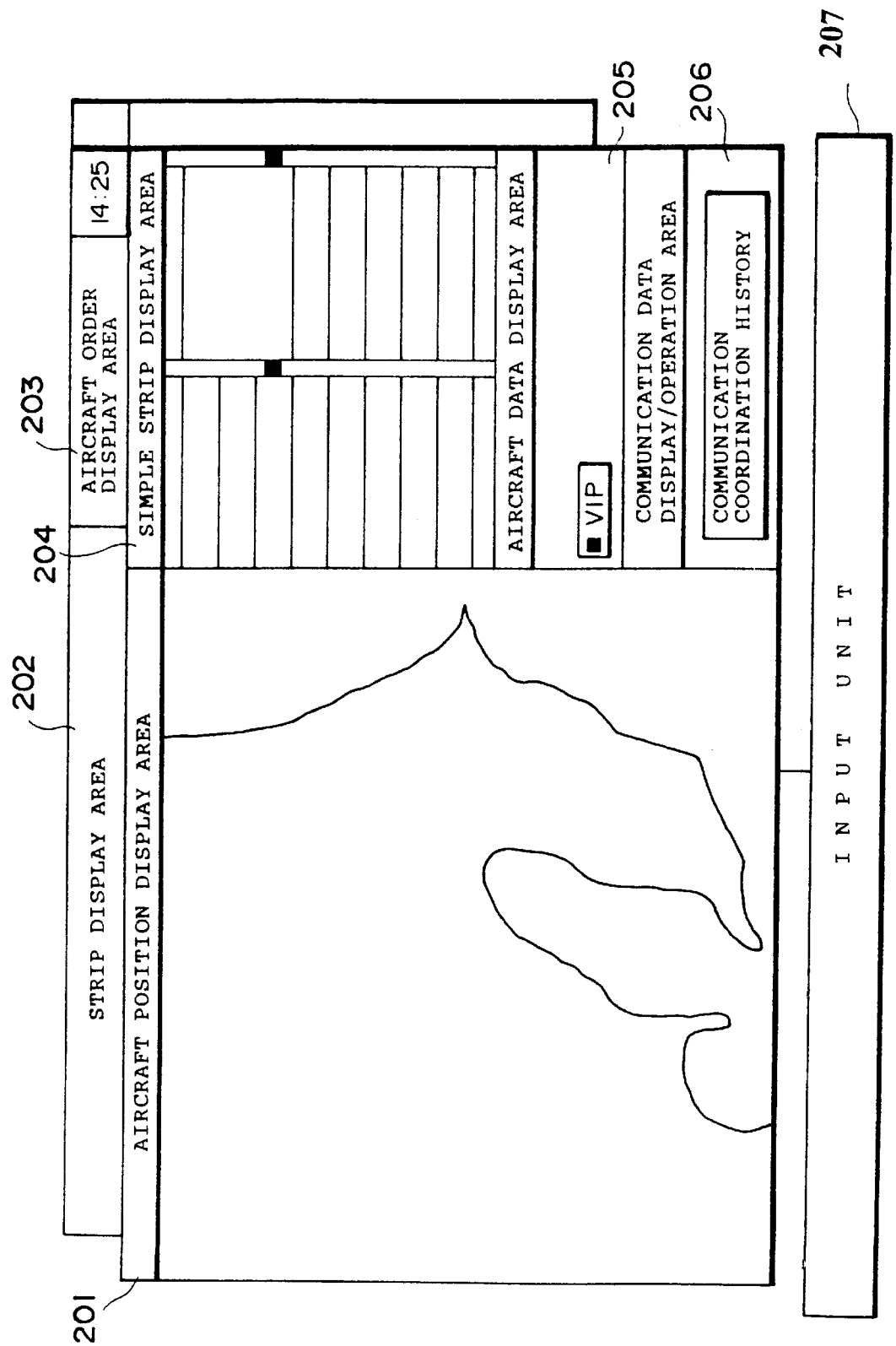
FIG. 7 is a detailed diagram showing a departure flight terminal of the embodiment according to the present invention.
Figure 8:
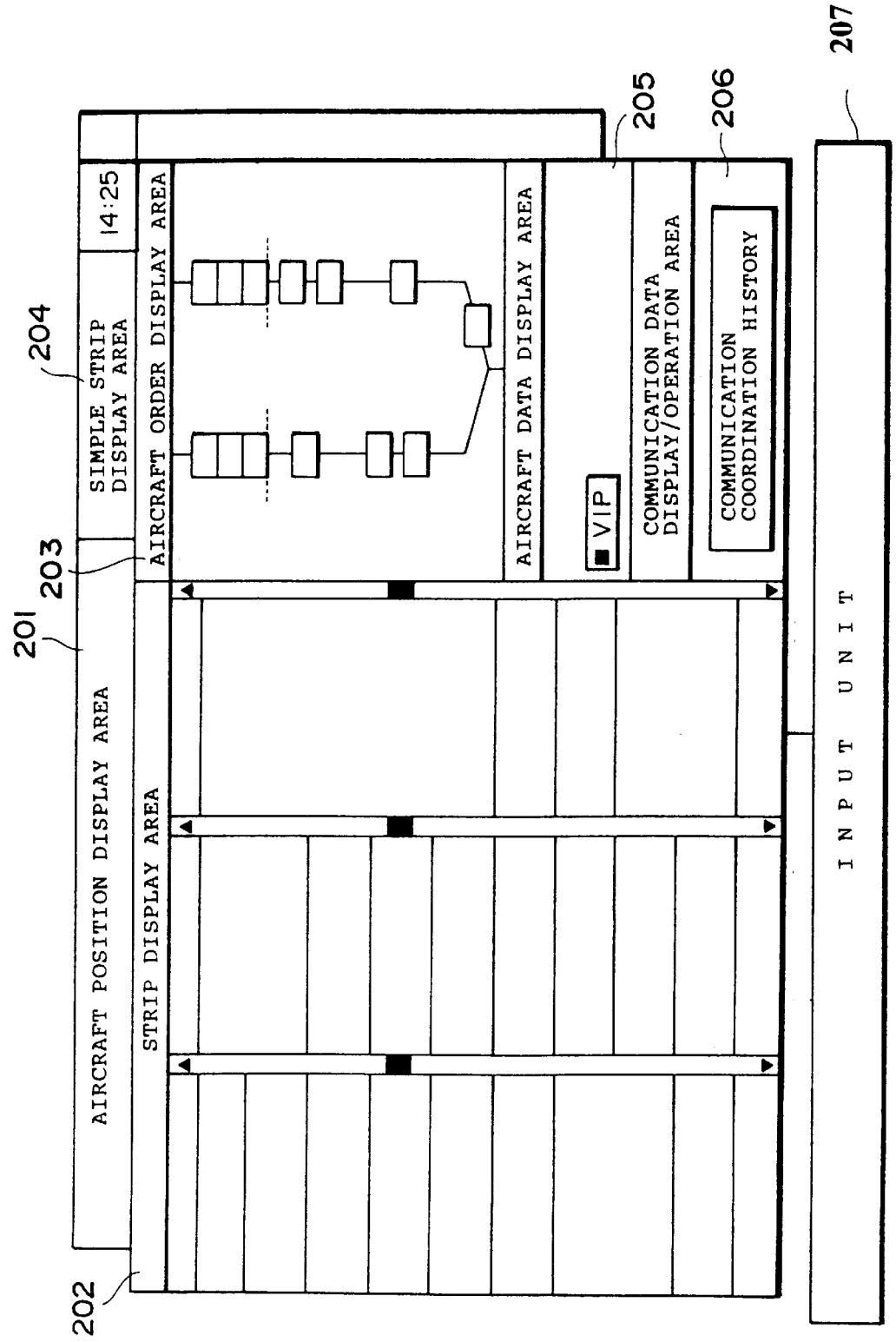
FIG. 8 is a detailed diagram showing an arrival flight terminal of the embodiment according to the present invention.

Now, the configuration of sub-control terminals is described. FIG. 7 shows the configuration of the departure flight sub-control terminal 14, and FIG. 8 shows the configuration of the arrival flight sub-control terminal 13. As shown in FIG. 7, the display screen of the departure flight sub-control terminal is composed of the aircraft position display area 201 or strip display area 202, aircraft order display area 203, simple strip display area 204, aircraft data display area 205, communication coordination data display/operation area 206, and input unit 207 used to control those areas.

As shown in FIG. 8, the display screen of the arrival flight sub-control terminal is composed of the strip display area 202 or the aircraft position display area 201, aircraft order display area 203, simple strip display area 204, aircraft data display area 205, communication coordination data display/operation area 206, and input unit 207 used to control those areas.

The following explains each component of a sub-control terminal. The first display area, the aircraft position display area 201, is explained with reference to FIG. 9(a). The aircraft position display area 201 may be switched with the strip display area 202. The aircraft position display area 201, shown in FIG. 9(a), has the function equivalent to that of the aircraft position display area 101 of the main-control terminal shown in FIG. 5(a). In the strip display area 202, flight plan data on aircraft which are flying or will be flying is displayed, as shown in FIG. 9(b).

Next, the second display area, the aircraft order display area, is explained with reference to 9(c) which shows the aircraft order display area 203. The aircraft order display area 203 may be switched with the simple strip display area 204. The aircraft order display area 203, shown in FIG. 9(c), has the function equivalent to that of the aircraft order display area 102 of the main-control terminal shown in FIG. 5(b). The simple strip display area 204, shown in FIG. 9(d), has the function equivalent to that of the simple strip display area 103 of the main-control terminal shown in FIG. 5 (c).

The third display area, the aircraft data display area, is now explained. The aircraft data display area 205, shown in FIG. 9 (e), has the function equivalent to that of the aircraft data display area 104 of the main-control terminal shown in FIG. 5(d).

The fourth display area, the communication coordination display/operation area, is now explained. In the communication coordination data display/operation area 206, shown in FIG. 9(f), messages prepared for communication coordination with other control facilities are displayed. Past coordination history data is also displayed. Examples of displayed coordination history data are "JAL323: CONFIRMSID [12:20]" (SID confirmation to JAL323 is returned to the tower at 12:20), "ANA081: CONFIRMSID [12:25]" (SID confirmation to ANA081 is returned to the tower at 12:25), and "RWY CHANGE******* [12:25]" (Runway change information is received from the tower at 12:25).

Figure 9:
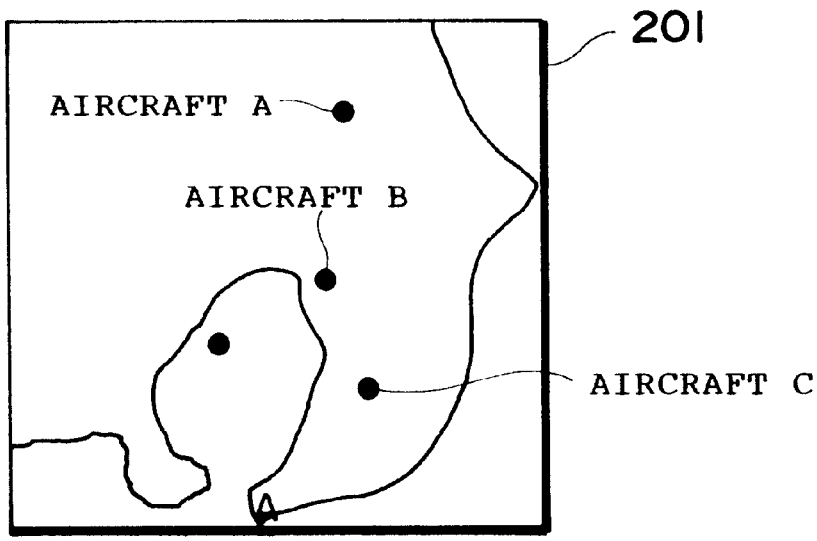
FIGS. 9(a)–9(g) are diagrams showing display areas of the sub-control terminal of the embodiment according to the present invention.
Figure 9:
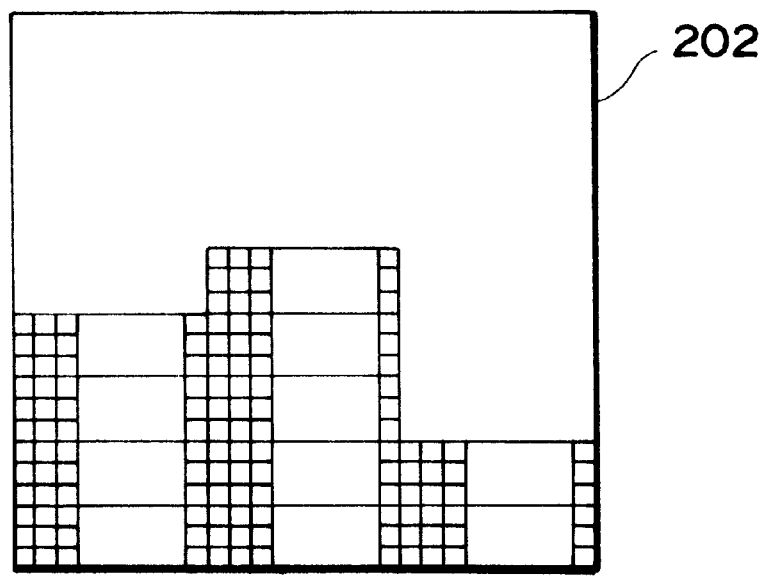
Figure 9C:
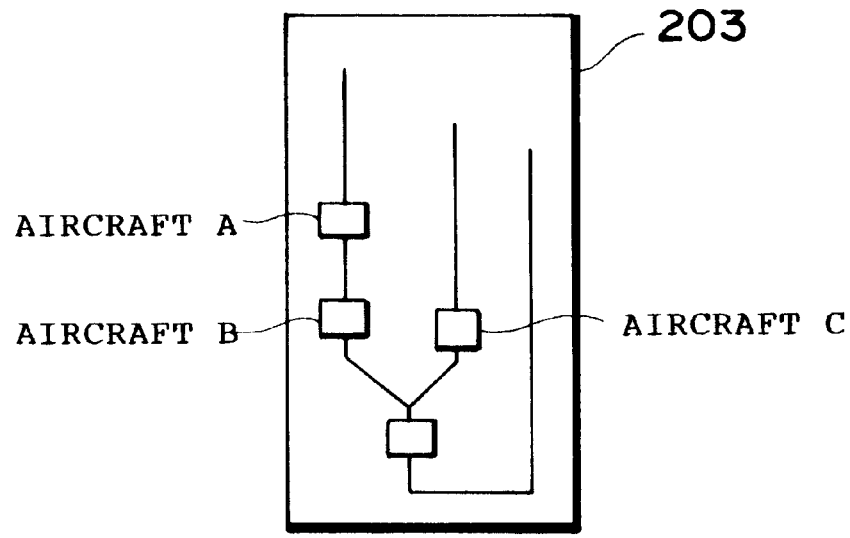
Figure 9D:
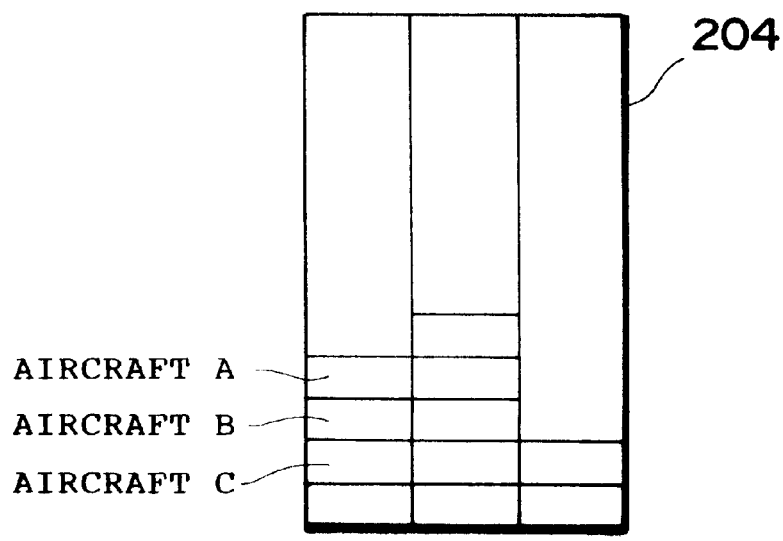
Figure 9E:
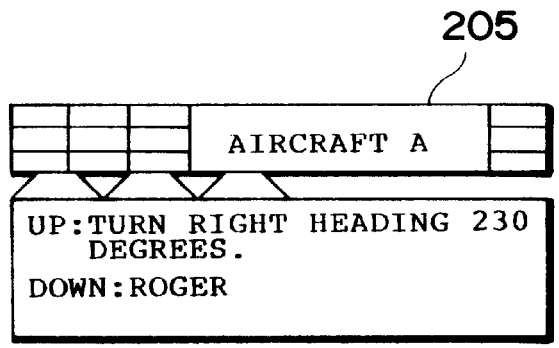
Figure 9F:
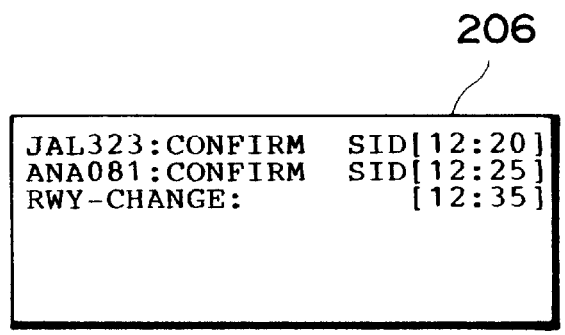
Figure 9G:
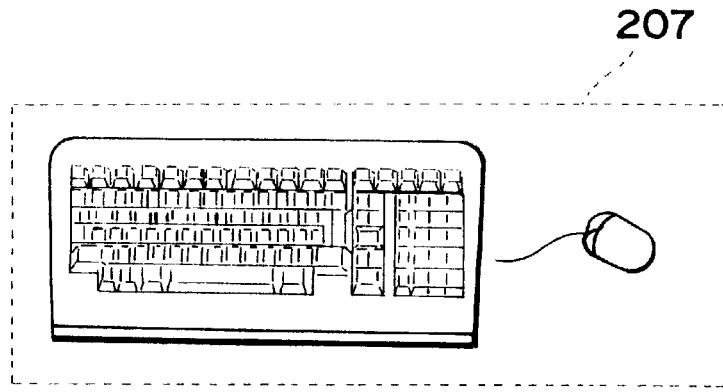

The input unit 207, shown in FIG. 9(g), is a device (keyboard+mouse) used to control the six display areas described above.

Figure 10:
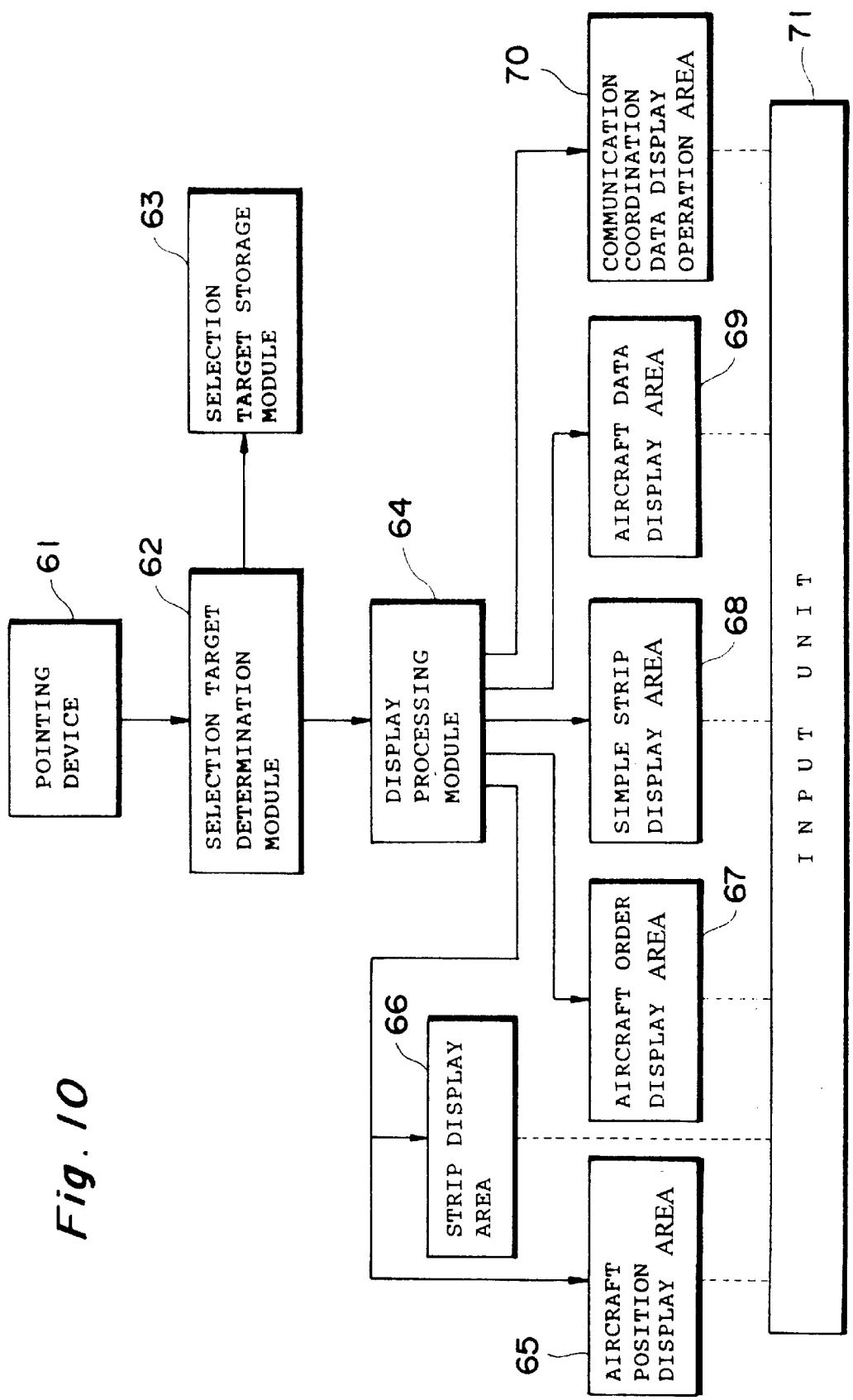
FIG. 10 is a block diagram showing a display screen processing system of the sub-control terminal of the embodiment according to the present invention.

FIG. 10 is a block diagram showing the display screen processing system of the embodiment according to the present invention. As shown in this figure, the display screen processing system of this sub-control terminal is composed of a pointing device 61, selection target determination module 62, selection target storage module 63, display processing module 64, aircraft position display area 65, strip display area 66, aircraft order display area 67, simple strip display area 68, aircraft data display area 69, communication coordination data display/operation module 70, and input unit 71 used to control the display areas.

The pointing device 61 is a mouse or a track ball (including a selection button and a cancel button) used to move the cursor or to select or cancel an object displayed on the CRT. The selection target determination module 62 determines which object on the CRT is selected. The selection target storage module 63 contains information on an object determined by the selection target determination module 62 as selected. The display processing module 64 displays one or more objects having the same call sign as that of an object which is selected and whose information is stored in the selection target storage module 63. In the aircraft position display area 65, aircraft flight information (current position, heading, altitude, and speed, etc.) and flight area information (flight area boundary, standard arrival route, radio flight facilities, FIX, etc.) are displayed. In the strip display area 66, the strips of all aircraft controlled by the sub-control terminal are displayed (all strip contents are displayed). In the aircraft order display area 67, information on arriving and departing aircraft is displayed in the order in which they are estimated to pass a specific point. In the simple strip display area 68, the strips of all aircraft controlled by the sub-control terminal are displayed (only the call sign of each strip is displayed). In the aircraft data display area 69, a strip and a history of messages transferred between the main-control terminal and pilots are displayed. The communication coordination data display/operation area 70 is used to display or process data used to communicate with other control facilities (ACC, Tower, and other control information facilities). The input unit 71 is, for example, a keyboard.

The following describes the operation of the man-machine interface apparatus for flight control systems according to the present invention.

Referring to FIGS. 5(a)–5(f), the operation of a controller will be described. Assume that, in FIG. 5(a) because the difference in arrival times between aircraft A and aircraft B is too large, aircraft C should be positioned therebetween. In this case, the controller performs the following steps.

Figure 5A:
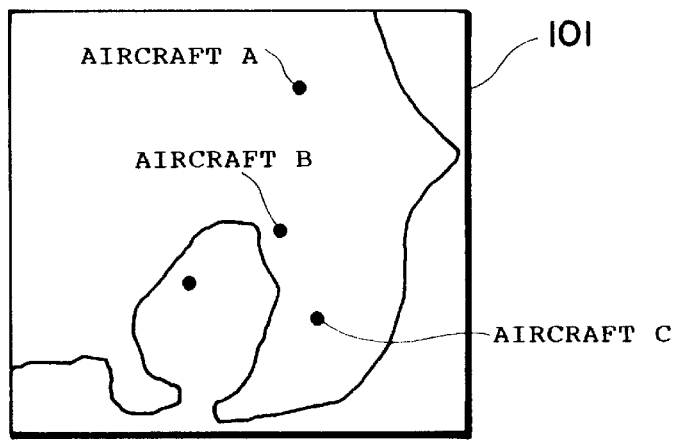
FIGS. 5(a)–5(f) are diagrams showing display areas of the main-control terminal of the embodiment according to the present invention.
Figure 6:
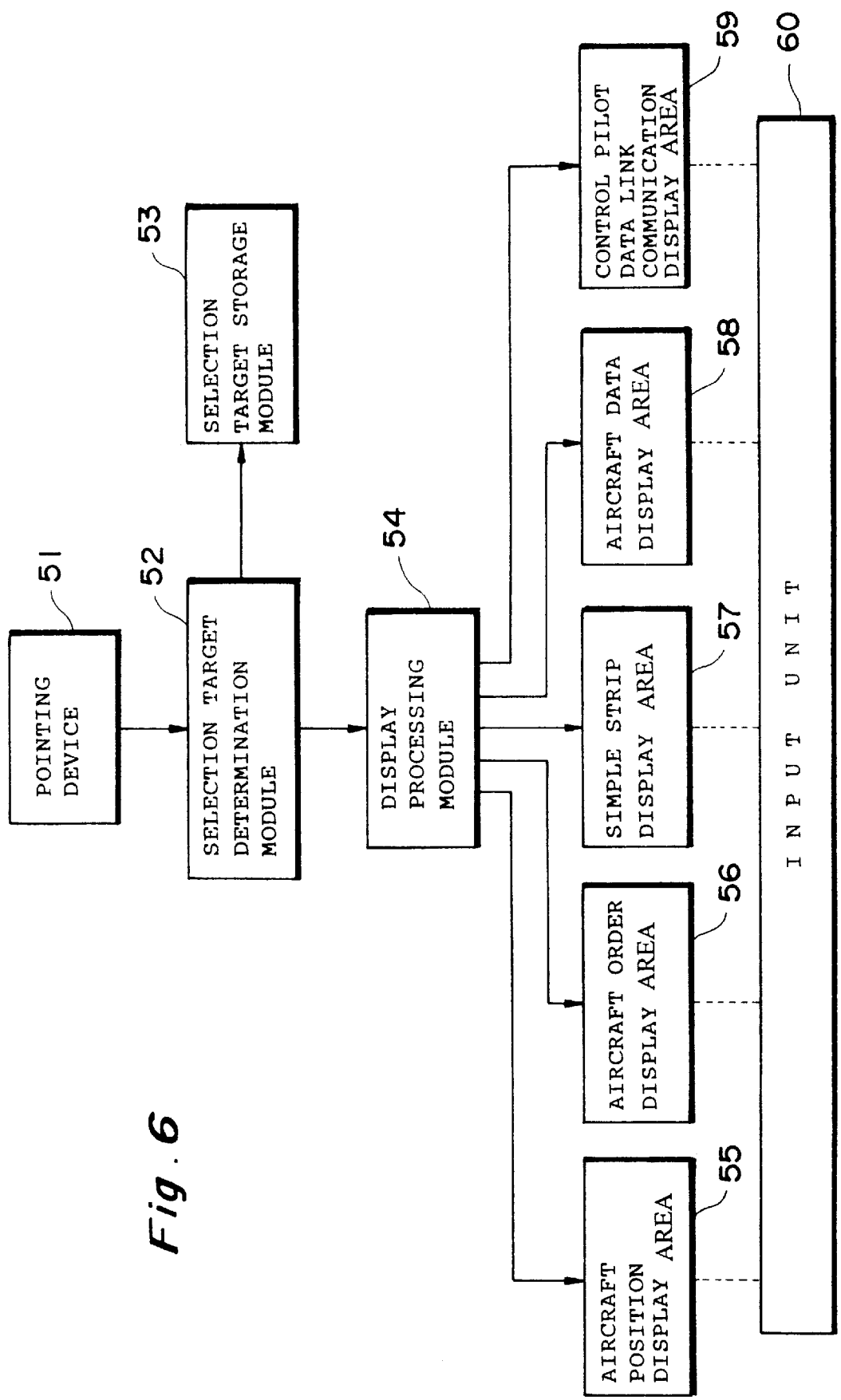
FIG. 6 is a block diagram showing a display screen processing system of the main-control terminal of the embodiment according to the present invention.

(1) Checking the aircraft position display area 101, shown in FIG. 5(a), to obtain the current position (heading, altitude, speed) of aircraft C.

Figure 5B:
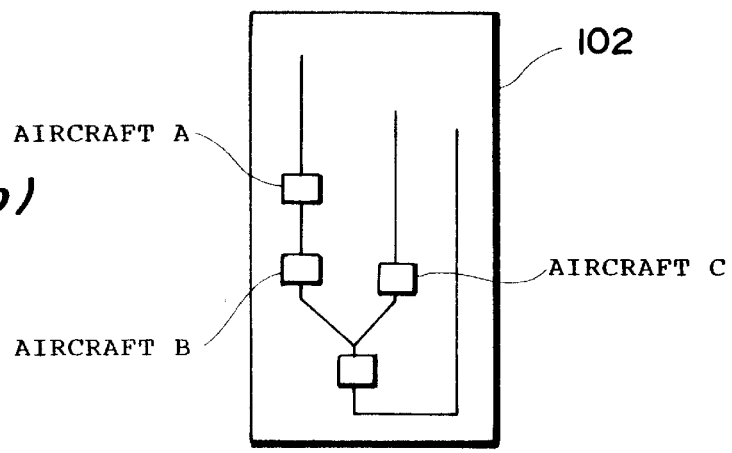

(2) Checking the aircraft order display area 102, shown in FIG. 5(b), to obtain the difference in arrival time (in minutes) at the fix (last check point) between aircraft A and aircraft B.

Figure 5C:
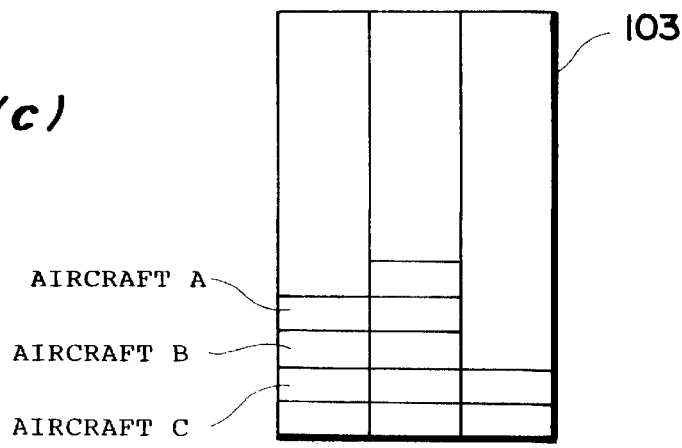
Figure 5D:
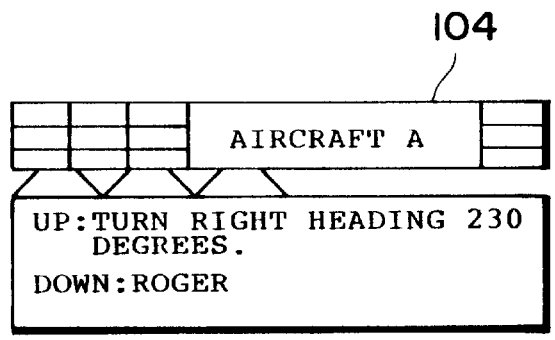
Figure 5E:
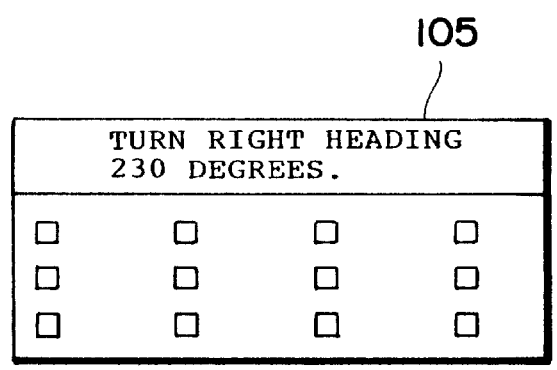
Figure 5F:
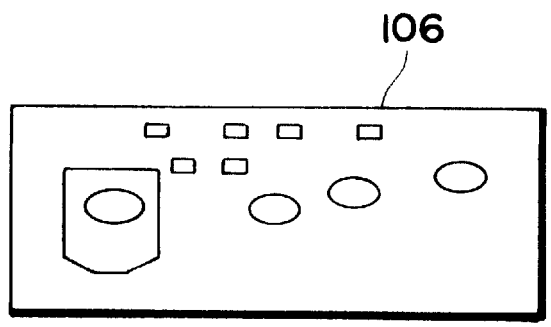

(3) Checking the simple strip display area 103, shown in FIG. 5(c), to obtain the flight plan data on aircraft C.

(4) Selecting aircraft A and aircraft B in the simple strip display area 103 to obtain the flight plan data.

(5) Issuing a flight instruction via the control pilot data link communication (CPDLC) display area 105 shown in FIG. 5 (e) or via the input unit (input device) 106 to request that aircraft C should be arranged between aircraft A and aircraft B if there is no problem. For example, a flight instruction saying "TURN RIGHT HEADING 220 DEGREES" (Turn the heading right 220 degrees) is issued.

Next, referring to FIGS. 9(a)–9(g) the operation of a sub-controller is described. When an approval request to increase the speed of aircraft A before handing over of the aircraft A to a neighboring control facility is received from the control facility, the sub-controller performs the following steps.

(1) Checking the communication coordination data display/operation area 206, shown in FIG. 9(f), to find that the other control facility has made a request to coordinate the flight of aircraft A.

(2) Checking the aircraft position display area 201, shown in FIG. 9(a), to check the positional relationship between aircraft A and other aircraft near aircraft A.

(3) Checking the strip display area 202, shown in FIG. 9(b), to obtain flight plan data on aircraft A.

(4) Checking the strip display area 202, shown in FIG. 9 (b), to obtain flight plan data on the aircraft near aircraft A.

(5) Checking the aircraft order display area 203, shown in FIG. 9(c), to determine whether or not the control instruction issued by the other controller to aircraft A satisfies by safety interval at the fix.

(6) Sending an approval to other control facilities via the input unit 207, shown in FIG. 8 and 9(g), if there is no problem.

Next, the controller performs operations as follows. To hand over aircraft, the controller selects aircraft A before entering a handing over instruction, At that time, the controller selects the call sign of aircraft A. The call sign symbol appears in the aircraft position display area 101 shown in FIG. 5(a), in the aircraft order display area 102 shown in FIG. 5(b), in the simple strip display area 103 shown in FIG. 5(c), and in the aircraft data display area 104 shown in FIG. 5(d). The controller may select aircraft A in any of these areas.

Next, the sub-controller performs operations as follows. When planning the flight of aircraft, the sub-controller selects aircraft A and then makes a plan based on various types of data. At that time, the sub-controller selects the call sign of aircraft A. The call sign appears in the aircraft position display area 201 shown in FIG. 9(a), in the aircraft data display area 205 shown in FIG. 9(e), in the strip display area 202 shown in FIG. 9(b), and in the simple strip display area 204 shown in FIG. 9(d). The sub-controller may select aircraft A in any of these areas.

It is possible to store all the control instructions transferred between controllers and pilots and to display them in the aircraft data display area. This makes it possible to check the history data on control communication between controllers and pilots as necessary.

In the above embodiment, the main-control terminal has five display areas, and the sub-control terminal has six display areas. Display areas may be added or reduced as necessary. In addition, the man-machine apparatus according to the present invention may be applied not only to terminal flight control apparatus but also to other apparatuses, like an "en-route" flight control apparatus which controls aircraft flying along an air way or air line.

The invention may be embodied in other specific forms without departing from the spirit or essential characteristics thereof.

The present invention detailed above has advantages as follows.

The five display areas, combined on the same display surface and therefore capable of being operated via one input unit, allow the controller to constantly monitor the aircraft position display area, the most important display area for keeping distances among aircraft more than a given one, while viewing other areas at the same time. The controller can implement such an operation without moving to another seat for another screen or another display area, but by viewing the same screen, thus improving the efficiency of controlling the aircraft flight and reducing the physical work or job burdened on the operator.

A plurality of display areas operate cooperatively. This indicates that an operation performed on one display area affects other display areas. For example, when aircraft A is selected in the aircraft position display area 101, aircraft A is selected also in the aircraft order display area 102 and the aircraft data display area 104. This reduces the workload of the controller, which leads to improved flight safety.

In most cases, the controller and the sub-controller do their work on the basis of data relevant to the aircraft to be processed. That is, a call sign is used as a factor common to various types of data in order to allow the controller and the sub-controller to search for required data. This facilitates the controlling operation of aircraft flight.

More display items require a larger display screen and makes it more difficult to view the items on the screen at the same time. Therefore, the apparatus of the embodiment has up to four display areas and enables the same display area to be switched. This eliminates the need to use a larger screen and enables the user to view data on the screen at the same time.

What is claimed is:

1. A flight control system user interface apparatus that displays a plurality of types of information on a plurality of aircraft, both on the ground and in the sky, comprising:
    a screen;
    a processing unit for processing two or more of the plurality of types of information so as to simultaneously, graphically display them as a plurality of graphical displays on the screen, said processing unit correlating said plurality of types of information on each aircraft with each other; and
    a selecting device for selecting one of the aircraft, the selection of a particular aircraft in one of the graphical displays of information o n the screen also selecting the information corresponding to the same aircraft in the other simultaneous graphical displays on the screen.

2. A flight control system user interface apparatus as claimed in claim 1, wherein the plurality of types of information for each aircraft includes at least one of the following: departure order, arrival order, flight plan, a message to be sent to an aircraft and a history of messages sent to aircraft.

3. A flight control system user interface apparatus as claimed in claim 2, wherein the message to be sent to an aircraft has digital data suitable for communication between a controller operating the flight control system user interface apparatus and a pilot flying the aircraft.

4. A flight control system user interface apparatus as claimed in claim 3, wherein the digital data complies with a controller pilot digital link communication protocol and application software therefor.

5. A flight control system user interface apparatus as claimed in claim 2, wherein the arrival order and departure order information are displayed in the order in which aircraft are estimated to pass a specific point.

6. A flight control system user interface apparatus as claimed in claim 5, wherein said input unit is used to enter messages from a controller using said apparatus that are to be sent to one of the aircraft.

7. A flight control system user interface apparatus as claimed in claim 1, further comprising:
    an input unit for controlling the simultaneous graphical information displays.

8. A flight control system user interface apparatus as claimed in claim 1, wherein at least one of the simultaneous graphical information displays is switchable with another graphical information display.

9. A flight control system user interface apparatus as claimed in claim 8, wherein an aircraft position display is switchable with a strip display.

10. A flight control system user interface apparatus as claimed in claim 1, wherein the number of simultaneous graphical information displays is at least four.

11. A flight control system user interface apparatus as claimed in claim 10, wherein the simultaneous graphical information displays include the following: an aircraft position display; a simple strip display; an aircraft data display; and a communication data/operation display.

12. A flight control system user interface apparatus as claimed in claim 11, wherein said aircraft position display is switchable with a strip display.

13. A flight control system user interface apparatus as claimed in claim 11, wherein said simple strip display is switchable with an aircraft order display.

14. A flight control system user interface apparatus displaying a plurality of types of information on a plurality of aircraft, both on the ground and in the sky, comprising:

a screen;

a pointing device;

a selection target determination module, responsive to said pointing device;

a selection target storage module, responsive to said selection target determination module;

a plurality of display areas for providing graphical displays of said plurality of types of information on said screen;

a display processing module, responsive to said selection target determination module, wherein said plurality of display areas are responsive to said display processing module such that when the selection target determination module indicates a particular aircraft in a particular display area, the same aircraft is selected in the others of the plurality of display areas; and an input unit for controlling the display areas.

15. A flight control system user interface apparatus as claimed in claim 14, wherein said plurality of display areas comprises at least four of the following:

an aircraft position display area;

an aircraft order display area;

a simple strip display area;

an aircraft data display area;

a control pilot data link communication display area; and a strip display area.

16. A flight control system user interface apparatus as claimed in claim 15, wherein said aircraft order display area displays information on arriving and departing aircraft in the order in which they are estimated to pass a specific point.

17. A flight control system user interface apparatus as claimed in claim 14, wherein said display processing module displays one or more aircraft having the same call sign as an aircraft which is selected using said pointing device, and whose information is stored in said selection target storage module.

* * * * *